US007046227B2

(12) United States Patent
Chan et al.

(10) Patent No.: US 7,046,227 B2
(45) Date of Patent: May 16, 2006

(54) SYSTEM AND METHOD FOR CONTINUOUSLY TRACING TRANSFER RECTANGLES FOR IMAGE DATA TRANSFERS

(75) Inventors: Victor Ga-Kui Chan, Richmond (CA); Doug McFadyen, Delta (CA); Atousa Soroushi, North Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 10/921,412

(22) Filed: Aug. 17, 2004

(65) Prior Publication Data

US 2006/0038830 A1 Feb. 23, 2006

(51) Int. Cl.
*G06T 11/00* (2006.01)

(52) U.S. Cl. .......................................................... 345/98

(58) Field of Classification Search .................. 345/98, 345/104, 204, 214

See application file for complete search history.

(56) References Cited

U.S. PATENT DOCUMENTS

| | | | | |
|---|---|---|---|---|
| 6,320,575 | B1 | 11/2001 | Terashima et al. | 345/1.1 |
| 6,504,533 | B1 * | 1/2003 | Murayama et al. | 345/204 |
| 6,583,771 | B1 | 6/2003 | Furuhashi et al. | 345/213 |
| 6,611,248 | B1 * | 8/2003 | Kanbara et al. | 345/100 |
| 6,747,628 | B1 * | 6/2004 | Yoneoka et al. | 345/100 |
| 2002/0196225 | A1 | 12/2002 | Fukuda et al. | 345/100 |

* cited by examiner

*Primary Examiner*—Almis R. Jankus
(74) *Attorney, Agent, or Firm*—Mark P. Watson

(57) ABSTRACT

A system and method for continuously tracing transfer rectangles for performing image data transfers includes a display controller with control logic, a rectangle module, and a coordinates module. The rectangle module detects write operations to on-screen data in a video memory, and then updates a primary transfer rectangle during a normal mode to include pixel data from the foregoing write operations. The coordinates module stores the primary transfer rectangle for performing a current transfer operation. The coordinates module enters a pause mode before initiating the current transfer operation, and retains the primary transfer rectangle during the pause mode. The coordinate module also stores a secondary transfer rectangle formed during the pause mode by detecting the foregoing write operations. The controller logic instructs the coordinates module to resume the normal mode after the current transfer operation concludes. The coordinates module then replaces the primary transfer rectangle with the secondary transfer rectangle for performing a subsequent transfer operation.

42 Claims, 10 Drawing Sheets

134

710

228

SYSTEM AND METHOD FOR CONTINUOUSLY TRACING TRANSFER RECTANGLES FOR IMAGE DATA TRANSFERS

BACKGROUND SECTION

1. Field of Invention

This invention relates generally to electronic display controller systems, and relates more particularly to a system and method for continuously tracing transfer rectangles for performing image data transfers.

2. Description of the Background Art

Implementing efficient methods for displaying electronic image data is a significant consideration for designers and manufacturers of contemporary electronic devices. However, efficiently displaying image data with electronic devices may create substantial challenges for system designers. For example, enhanced demands for increased device functionality and performance may require more system operating power and require additional hardware resources. An increase in power or hardware requirements may also result in a corresponding detrimental economic impact due to increased production costs and operational inefficiencies.

Furthermore, enhanced device capability to perform various advanced display control operations may provide additional benefits to a system user, but may also place increased demands on the control and management of various device components. For example, an enhanced electronic device that efficiently manipulates, transfers, and displays digital image data may benefit from an efficient implementation because of the large amount and complexity of the digital data involved.

Due to growing demands on system resources and substantially increasing data magnitudes, it is apparent that developing new techniques for controlling the display of electronic image data is a matter of concern for related electronic technologies. Therefore, for all the foregoing reasons, developing efficient systems for displaying electronic image data remains a significant consideration for designers, manufacturers, and users of contemporary electronic devices.

SUMMARY

In accordance with the present invention, a system and method are disclosed for continuously tracing transfer rectangles for performing image data transfers. In certain embodiments, a portable electronic device may be implemented to include a central-processing unit (CPU), one or more displays, and a display controller. A rectangle module of the display controller monitors on-screen data in a video memory for image-data write operations during which the CPU or other appropriate entities transfer image data into on-screen data.

When such image-data write operations occur, the rectangle module performs a rectangle update procedure for ensuring that a current updated transfer rectangle includes all newly-updated image pixels. Therefore, whenever a transfer operation is initiated by the display controller for transferring image data from the video memory to the display, only altered image data from the current updated transfer rectangle need be transferred, instead of inefficiently transferring entire frames of image data during each transfer operation.

In certain embodiments, in a normal mode, the rectangle module provides new pixel coordinates for updated transfer rectangles to a secondary latch in a coordinates module of the display controller. The secondary latch then stores the received pixel coordinates as secondary rectangle coordinates. The secondary latch also passes the secondary rectangle coordinates to a primary latch in the coordinates module. In response, the primary latch stores the received secondary rectangle coordinates as primary rectangle coordinates. The primary latch may then provide the primary rectangle coordinates to controller logic of the display controller whenever a partial transfer of a current transfer rectangle is initiated.

In certain embodiments, the controller logic advantageously instructs the coordinates module to enter a pause mode while transfer operations are being serviced. To enter the foregoing pause mode, the controller logic or other appropriate entity sets a pause flag that is provided to the primary latch of the coordinates module. The pause flag is set whenever a transfer operation is being performed for sending a primary transfer rectangle of image data to the display. In practice, setting the pause flag causes the primary latch to retain the currently latched primary rectangle coordinates for performing the corresponding current transfer operation.

However, in the pause mode, the secondary latch of coordinates module is not affected by the pause flag, and therefore continues to update secondary rectangle coordinates for any new secondary transfer rectangles that are detected by the rectangle module during the current transfer operation. When the pause flag is reset after a current transfer operation has been completed, then the coordinates module may resume the foregoing normal mode. The primary latch then advantageously receives and stores the secondary rectangle coordinates as primary rectangle coordinates. The new primary rectangle coordinates thus reflect any new secondary transfer rectangles that were traced during the completed current transfer operation.

The primary latch may then make the newly-updated primary rectangle coordinates available to the controller logic of display controller for effectively performing a subsequent transfer operation without any loss of intervening image data that was written into on-screen data of video memory during the previous transfer operation. The present invention therefore provides an improved system and method for continuously tracing transfer rectangles for performing image data transfers.

DETAILED DESCRIPTION

The present invention relates to an improvement in display controller systems. The following description is presented to enable one of ordinary skill in the art to make and use the invention, and is provided in the context of a patent application and its requirements. Various modifications to the embodiments disclosed herein will be apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for continuously tracing transfer rectangles for performing image data transfers, and may include a display controller with control logic, a rectangle module, and a coordinates module. The rectangle module detects write operations to on-screen data in a video memory, and then updates a primary transfer rectangle during a normal mode to include pixel data from the foregoing write operations. The coordinates module stores the primary transfer rectangle for performing a current transfer operation.

The coordinates module enters a pause mode before the current transfer operation is initiated, and retains the primary transfer rectangle during the pause mode. The coordinate module also stores a secondary transfer rectangle formed during the pause mode by detecting the foregoing write operations. The controller logic instructs the coordinates module to resume the normal mode after the current transfer operation concludes. The coordinates module then replaces the primary transfer rectangle with the secondary transfer rectangle for performing a subsequent transfer operation.

Figure 1:
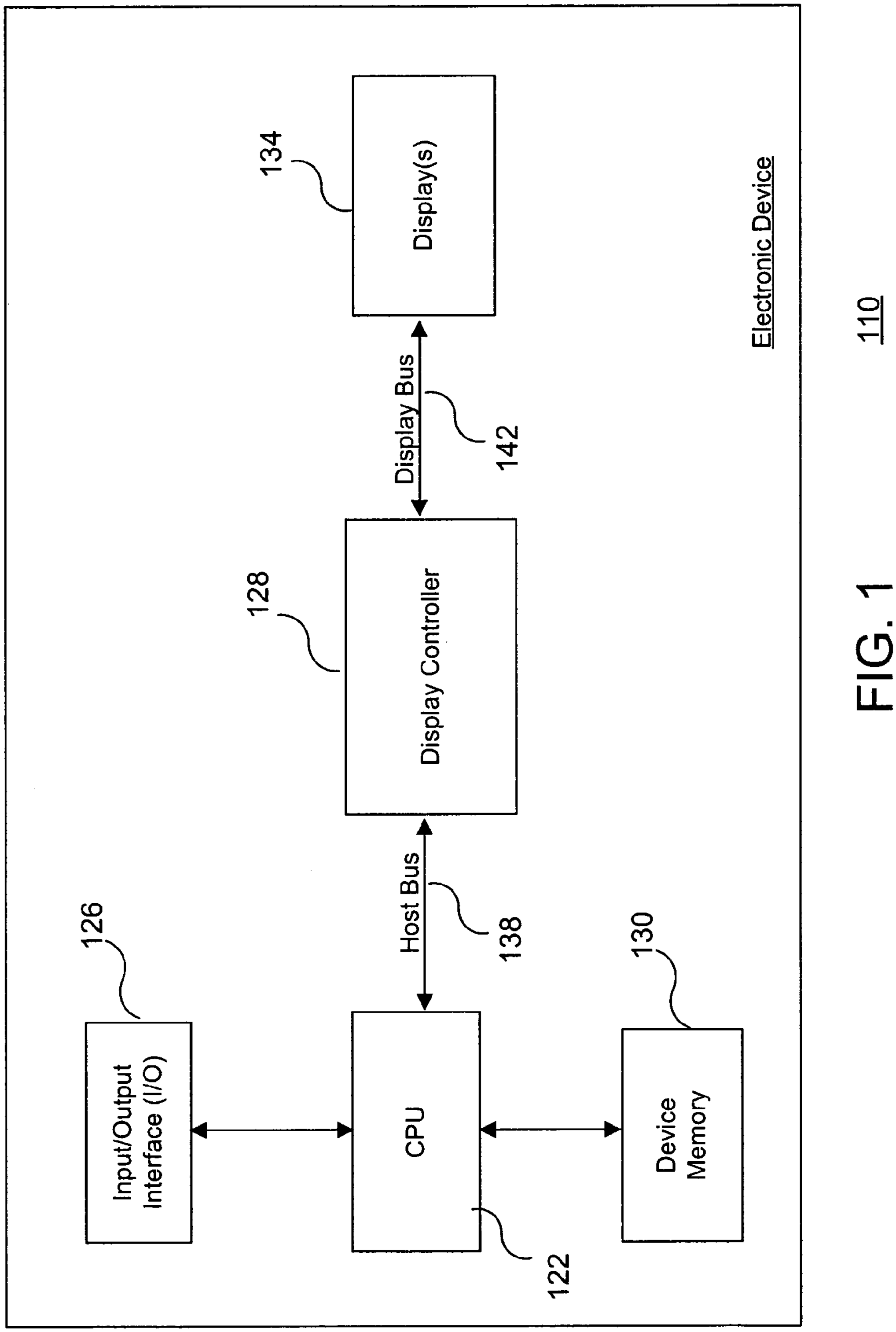
FIG. 1 is a block diagram for one embodiment of an electronic device, in accordance with the present invention.

Referring now to FIG. 1, a block diagram for one embodiment of an electronic device 110 is shown, according to the present invention. The FIG. 1 embodiment includes, but is not limited to, a central processing unit (CPU) 122, an input/output interface (I/O) 126, a display controller 128, a device memory 130, and one or more display(s) 134. In alternate embodiments, electronic device 110 may include elements or functionalities in addition to, or instead of, certain of the elements or functionalities discussed in conjunction with the FIG. 1 embodiment.

In the FIG. 1 embodiment, CPU 122 may be implemented as any appropriate and effective processor device or microprocessor to thereby control and coordinate the operation of electronic device 110 in response to various software program instructions. In the FIG. 1 embodiment, device memory 130 may comprise any desired storage-device configurations, including, but not limited to, random access memory (RAM), read-only memory (ROM), and storage devices such as removable memory or hard disk drives. In the FIG. 1 embodiment, device memory 130 may include, but is not limited to, a device application of program instructions that are executed by CPU 122 to perform various functions and operations for electronic device 110. The particular nature and functionality of the device application typically varies depending upon factors such as the type and specific use of the corresponding electronic device 110.

In the FIG. 1 embodiment, the foregoing device application may include program instructions for allowing CPU 122 to provide image data and corresponding transfer and display information via host bus 138 to display controller 128. In accordance with the present invention, display controller 128 then responsively provides the received image data via display bus 142 to at least one of the display(s) 134 of electronic device 110. In the FIG. 1 embodiment, input/output interface (I/O) 126 may include one or more interfaces to receive and/or transmit any required types of information to or from electronic device 110. Input/output interface 126 may include one or more means for allowing a device user to communicate with electronic device 110. In addition, various external electronic devices may communicate with electronic device 110 through I/O 126. For example, a digital imaging device, such as a digital camera, may utilize input/output interface 126 to provide captured image data to electronic device 110.

In the FIG. 1 embodiment, electronic device 110 may advantageously utilize display controller 128 for efficiently managing various operations and functionalities relating to display(s) 134. The implementation and functionality of display controller 128 is further discussed below in conjunction with FIGS. 2–4 and 6–10. In the FIG. 1 embodiment, electronic device 110 may be implemented as any desired type of electronic device or system. For example, in certain embodiments, electronic device 110 may alternately be implemented as a cellular telephone, a personal digital assistant device, an electronic imaging device, or a computer device. Various embodiments for the operation and utilization of electronic device 110 are further discussed below in conjunction with FIGS. 2–10.

Figure 2:
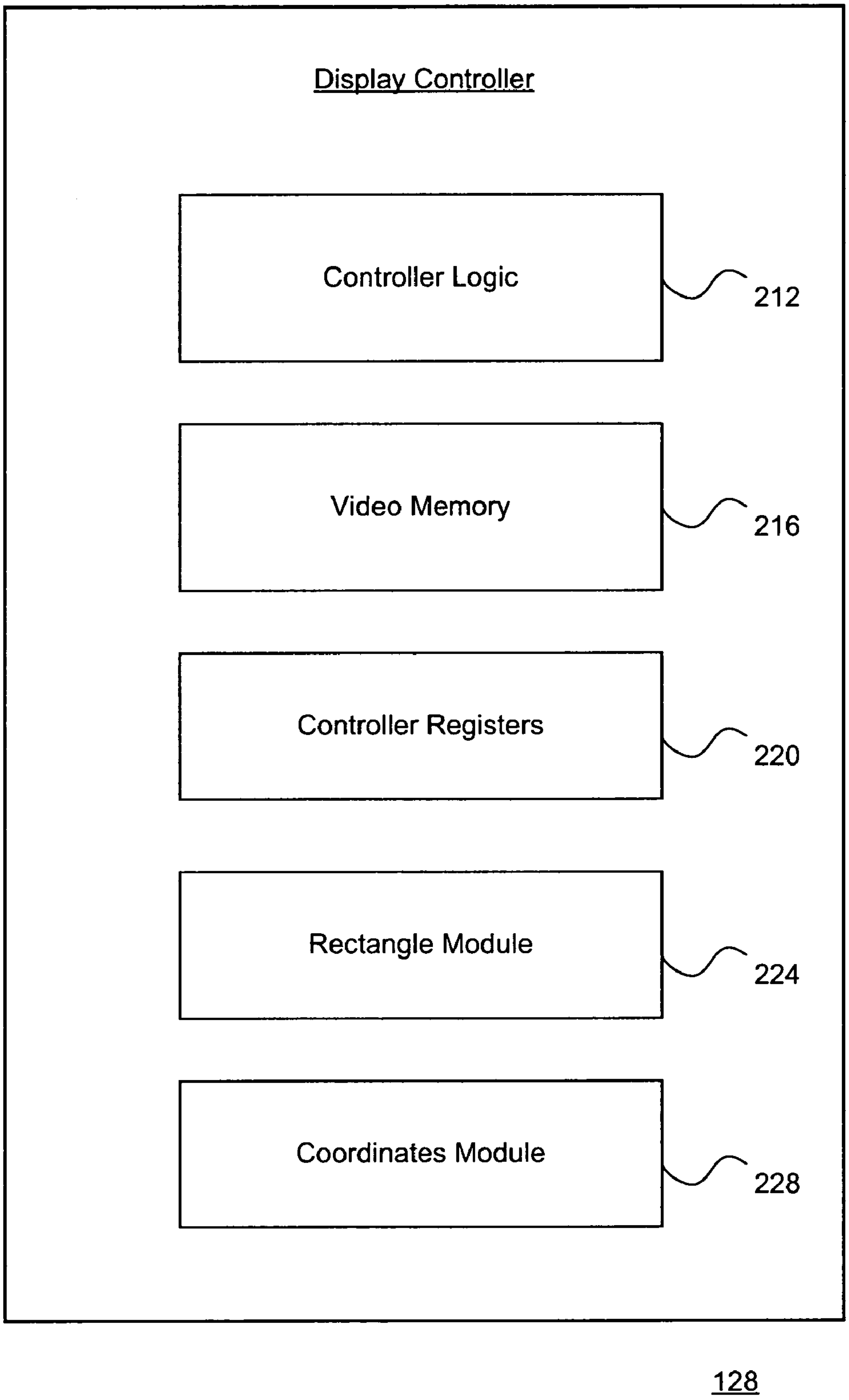
FIG. 2 is a block diagram for one embodiment of the display controller of FIG. 1, in accordance with the present invention.

Referring now to FIG. 2, a block diagram for one embodiment of the FIG. 1 display controller 128 is shown, according to the present invention. The FIG. 2 embodiment includes, but is not limited to, controller logic 212, video memory 216, controller registers 220, a rectangle module 224, and a coordinates module 228. In alternate embodiments, display controller 128 may include elements or functionalities in addition to, or instead of, certain of the elements or functionalities discussed in conjunction with the FIG. 2 embodiment.

In the FIG. 2 embodiment, display controller 128 may be implemented as an integrated circuit device that accepts image data and corresponding transfer and display information from CPU 122 (FIG. 1). Display controller 128 then advantageously provides the received image data to display 134 of electronic device 110 in an appropriate and efficient manner for displaying to a device user. In the FIG. 2 embodiment, controller logic 212 manages the overall operation of display controller 128. In certain embodiments, controller logic 212 may include, but is not limited to, an image creation module and an a transfer module. The image creation module manages reading image data from video memory 216, and forming corresponding image pixels for display according to information from controller registers 220. The transfer module manages transfer operations of appropriate sets of image pixels from display controller 128 to display 134.

In the FIG. 2 embodiment, display controller 128 may utilize rectangle module 224 for creating and updating transfer rectangles of image pixels for performing transfer operations from display controller 128 to display 134. In accordance with the present invention, display controller 128 advantageously utilizes coordinates module 228 for continuously tracing transfer rectangles of image pixels for performing transfer operations from display controller 128 to display 134. Certain embodiments for the implementation and utilization of rectangle module 224 are further discussed below in conjunction with FIGS. 6 and 9–10. In addition, certain embodiments for the implementation and utilization of coordinates module 228 are further discussed below in conjunction with FIGS. 8–10.

Figure 3:
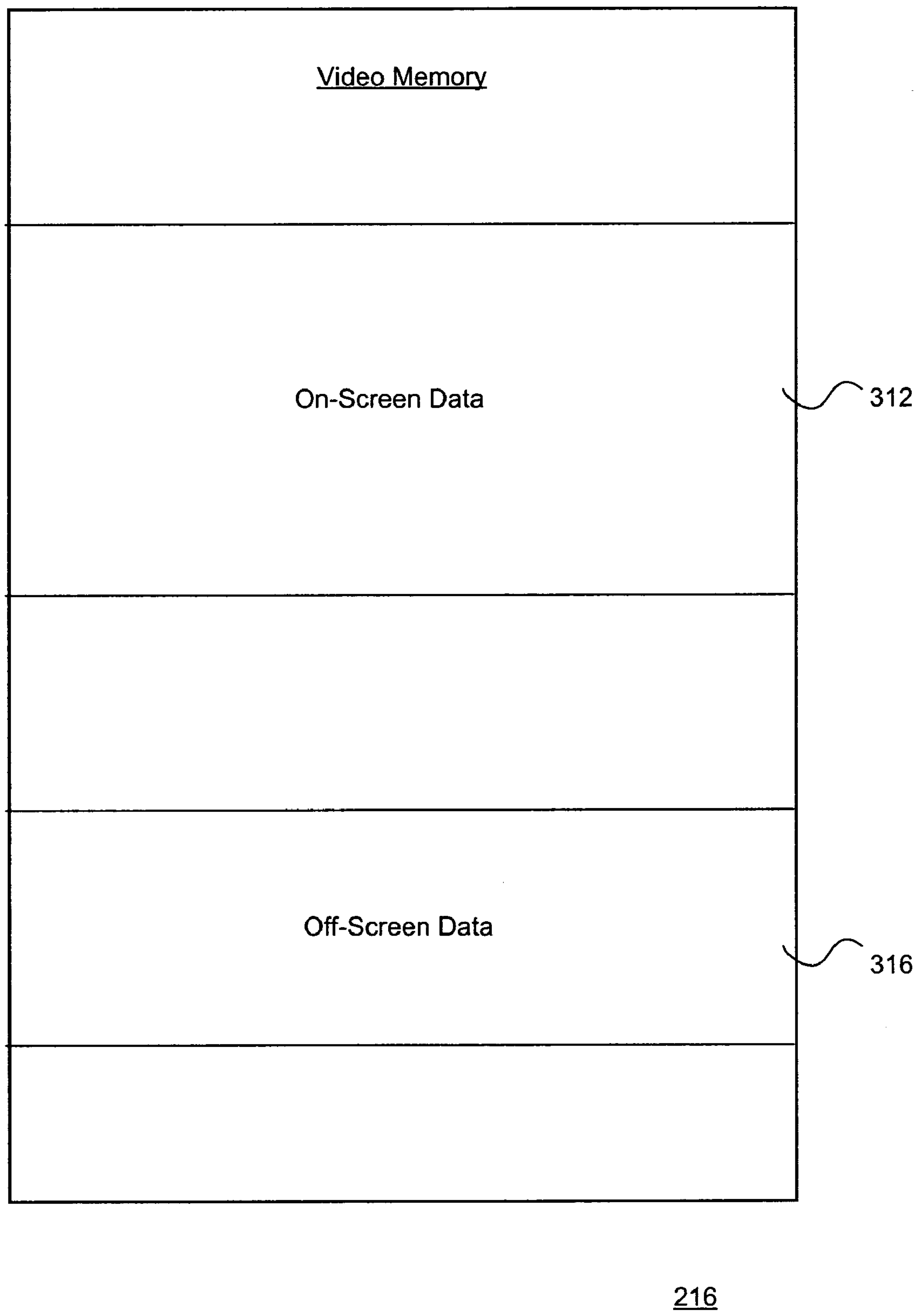
FIG. 3 is a block diagram for one embodiment of the video memory of FIG. 2, in accordance with the present invention.

Referring now to FIG. 3, a block diagram for one embodiment of the FIG. 2 video memory 216 is shown, in accordance with the present invention. In the FIG. 3 embodiment, video memory 216 includes, but is not limited to, on-screen data 312 and off-screen data 316. In alternate embodiments, video memory 216 may include elements and functionalities in addition to, or instead of, certain of the elements and functionalities discussed in conjunction with the FIG. 3 embodiment.

In the FIG. 3 embodiment, video memory 216 may be implemented by utilizing any effective types of memory devices or configurations. For example, in certain embodiments, video memory 216 may be implemented as a random-access memory (RAM) device. In the FIG. 3 embodiment, on-screen data 312 and off-screen data 316 are each shown as single contiguous memory blocks in video memory 216. However, in various other embodiments, different components of on-screen data 312 and/or off-screen data 316 may readily be stored as multiple non-contiguous memory blocks within video memory 216.

In the FIG. 3 embodiment, CPU 122 (FIG. 1) writes image data into on-screen data 312 for transfer by display controller 128 to display 134 of electronic device 110 for viewing by a device user. In the FIG. 3 embodiment, on-screen data 312 includes any appropriate type of information for display upon a screen of display 134 (FIG. 1). For example, on-screen data 312 may include main image data corresponding to a main window area on display 134. In addition, on-screen data 312 may include picture-in-picture (PIP) image data corresponding to one or more picture-in-picture window areas that are positioned within the foregoing main window area on display 134.

In the FIG. 3 embodiment, off-screen data 316 may include any appropriate type of information or data that is not displayed upon display 134 of electronic device 110. For example, off-screen data 316 may be utilized to support various types of double buffering schemes for display controller 128, or may also be utilized to cache certain fonts or other objects for use by display controller 128. The utilization of video memory 216 is further discussed below in conjunction with FIGS. 6–7 and 9–10.

Figure 4:
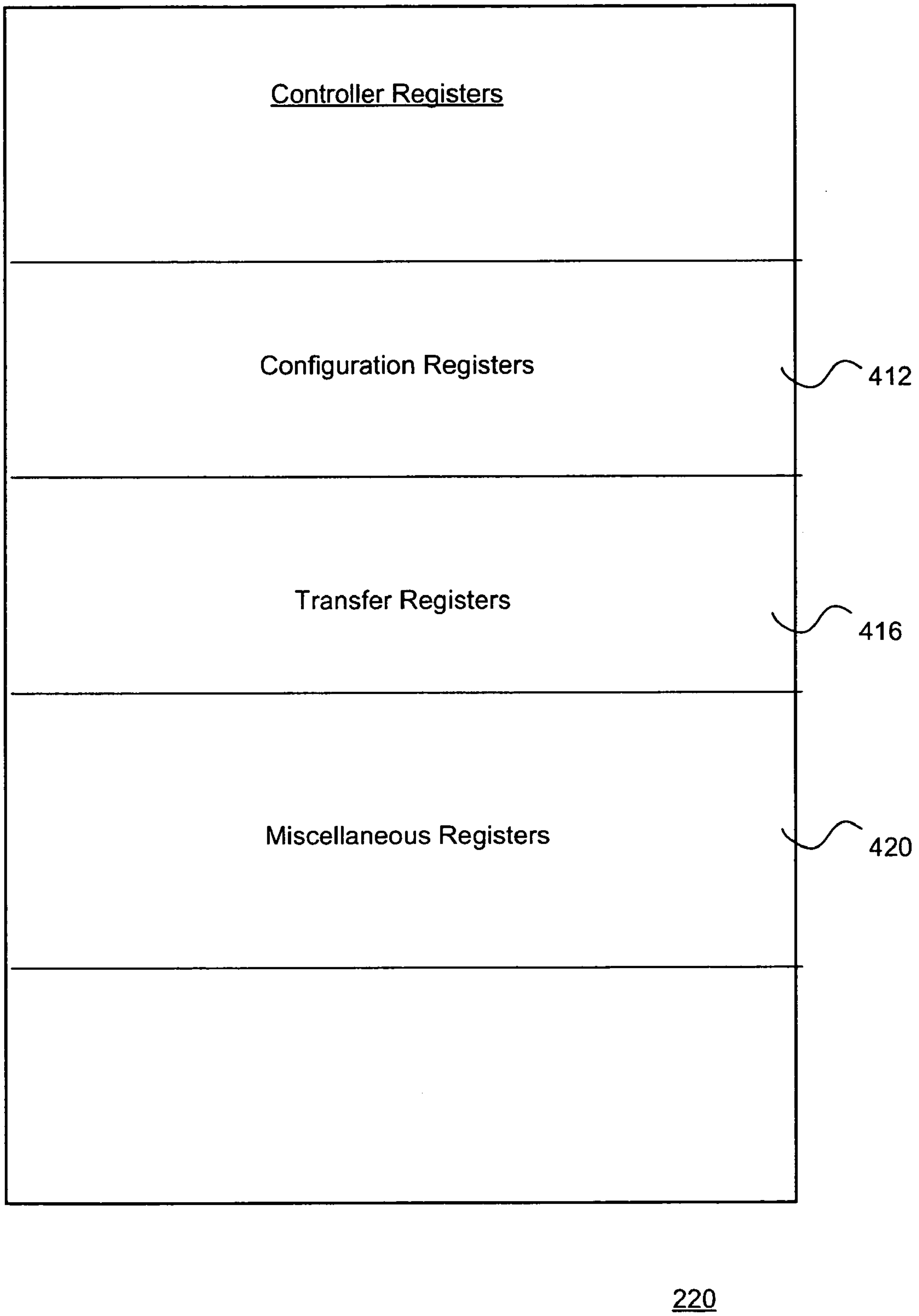
FIG. 4 is a block diagram for one embodiment of the controller registers of FIG. 2, in accordance with the present invention.

Referring now to FIG. 4, a block diagram for one embodiment of the FIG. 2 controller registers 220 is shown, in accordance with the present invention. In the FIG. 4 embodiment, controller registers 220 include, but are not limited to, configuration registers 412, transfer registers 416, and miscellaneous registers 420. In alternate embodiments, controller registers 220 may include elements and functionalities in addition to, or instead of, certain of the elements and functionalities discussed in conjunction with the FIG. 4 embodiment.

In the FIG. 4 embodiment, CPU 122 (FIG. 1) or other appropriate entities may advantageously write information into controller registers 220 to specify various types of operational parameters and other relevant information for use by configuration logic 212 of display controller 128. In the FIG. 4 embodiment, controller registers 220 may utilize configuration registers 412 for storing various types of information relating to the configuration of display controller 128 and/or display 134 of electronic device 110. For example, configuration registers 412 may specify a display type, a display size, a display frame rate, and various display timing parameters. In the FIG. 4 embodiment, controller registers 220 may utilize transfer registers 416 for storing various types of information relating to transfer operations for providing pixel data from video memory 216 (FIG. 3) to display 134 of electronic device 110. In the FIG. 4 embodiment, controller registers 220 may utilize miscellaneous registers 420 for effectively storing any desired type of information or data for use by display controller 128.

Figure 5:
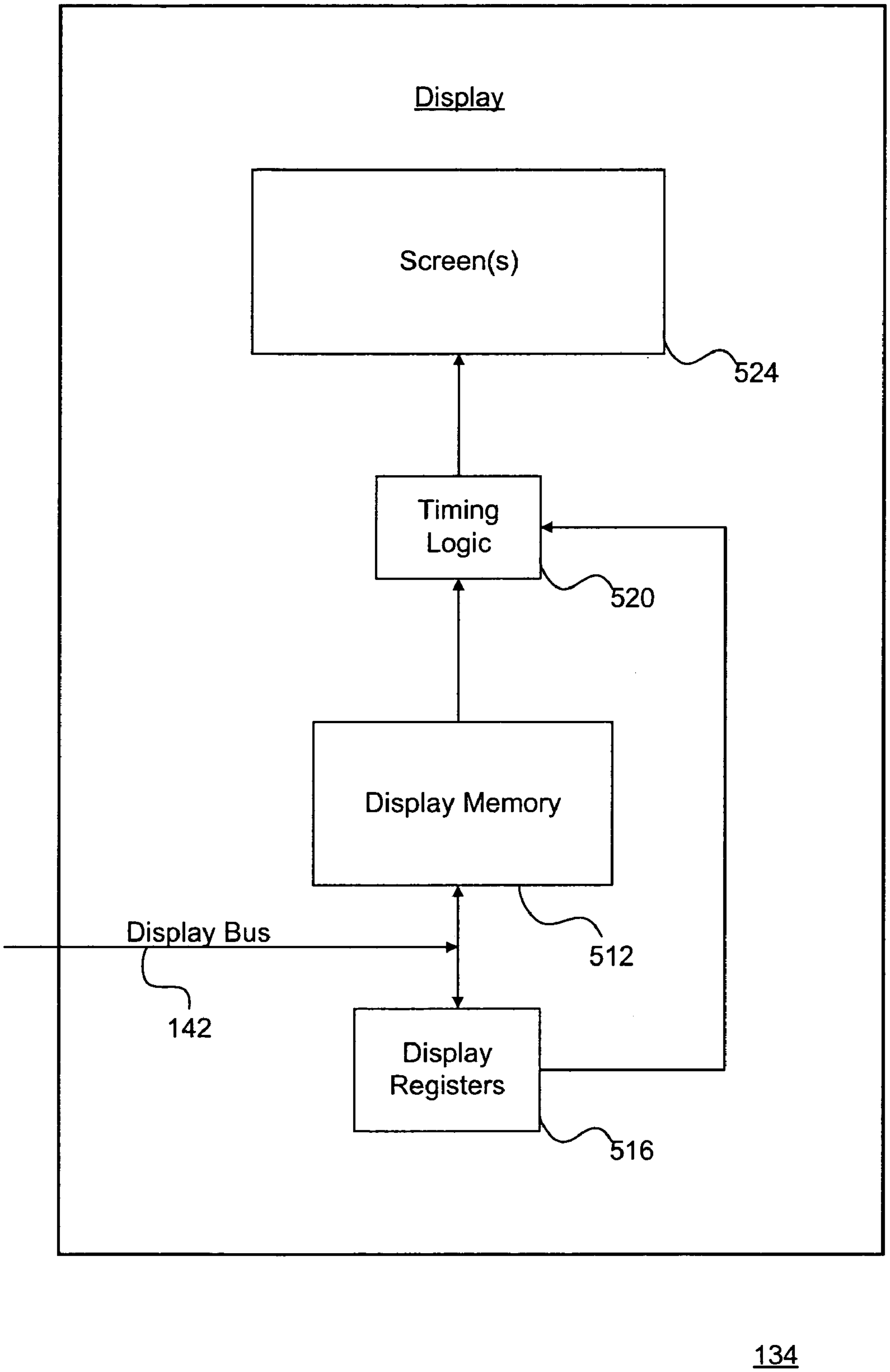
FIG. 5 is a block diagram for one embodiment of the display of FIG. 1, in accordance with the present invention.

Referring now to FIG. 5, a block diagram for one embodiment of the FIG. 1 display 134 is shown, in accordance with the present invention. In the FIG. 5 embodiment, display 134 includes, but is not limited to, a display memory 512, display registers 516, timing logic 520, and one or more screen(s) 524. In alternate embodiments, display 134 may include elements and functionalities in addition to, or instead of, certain of the elements and functionalities discussed in conjunction with the FIG. 5 embodiment.

In the FIG. 5 embodiment, display 134 is implemented as a random-access-memory based liquid-crystal display panel (RAM-based LCD panel). However, in alternate embodiments, display 134 may be implemented by utilizing any type of appropriate display technologies or configurations. In the FIG. 5 embodiment, display controller 128 provides various types of display information to display registers 516 via display bus 142. Display registers 516 may then utilize the received display information for effectively controlling timing logic 520.

In addition, display controller 128 provides image data from video memory 216 (FIG. 2) to display memory 512 via display bus 142. In the FIG. 5 embodiment, display memory 512 is typically implemented as random-access memory (RAM). However, in various other embodiments, any effective types or configurations of memory devices may be utilized to implement display memory 512. In the FIG. 5 embodiment, display memory 512 then advantageously provides the image data received from display controller 128 to one or more screens 524 via timing logic 520 for viewing by a device user of electronic device 110. Various techniques for efficiently transferring image data to display 134 are further discussed below in conjunction with FIGS. 6–10.

Figure 6:
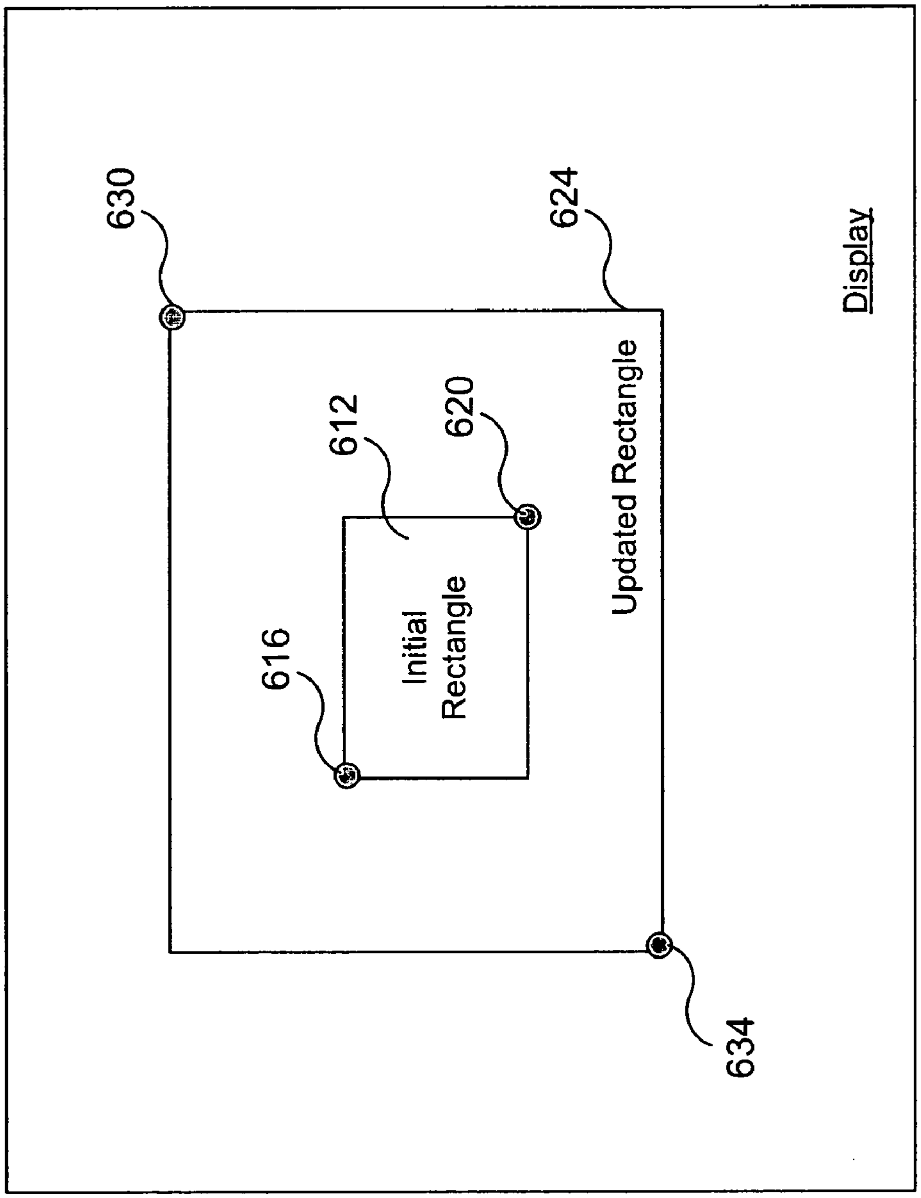
FIG. 6 is a block diagram illustrating a transfer rectangle updating procedure, in accordance with one embodiment of the present invention.

Referring now to FIG. 6, a block diagram illustrating a transfer rectangle updating procedure is shown, in accordance with one embodiment of the present invention. The FIG. 6 embodiment is provided for purposes of illustration, and in alternate embodiments, the present invention may update transfer rectangles using procedures that include elements and functionalities in addition to, or instead of, certain of the elements and functionalities discussed in conjunction with the FIG. 6 embodiment.

In the FIG. 6 embodiment, a rectangle module 224 (FIG. 2) monitors on-screen data 312 in video memory 216 (FIG. 3) for image-data write operations during which CPU 122 or other appropriate entities transfer image data into on-screen data 312. Whenever such image-data write operations occur, rectangle module 224 performs a rectangle update procedure to ensure that a current updated transfer rectangle includes all pixels corresponding to the written image data. Therefore, whenever a transfer operation is initiated by display controller 128 for transferring image data from video memory 216 to display 134, only image data from the current updated transfer rectangle need be transferred, instead of inefficiently transferring an entire frame of image data during each transfer operation.

The utilization of the foregoing transfer rectangles to perform transfer operations to display 134 thus conserves substantial system resources by reducing the amount of data involved. Furthermore, a significant reduction in operating power consumption results because only changed pixels in on-screen data 312 need to be refreshed instead of repeatedly refreshing entire frames of pixels on display 134.

The size and location of a particular transfer rectangle is typically defined by utilizing the following notation:

$$[(x_1,y_1),(x_2,y_2)]$$

where $(x_1, y_1)$ are the pixel coordinates of the top left pixel from the corresponding transfer rectangle, and where $(x_2, y_2)$ are the bottom right coordinates of that same transfer rectangle. Each of the pixel coordinates of a transfer rectangle maps to a corresponding location in on-screen data 312 of video memory 216 (FIG. 3).

In the FIG. 6 example, rectangle module 224 has initially formed an initial rectangle 612 after pixel 616 and pixel 620 were written into on-screen data 312 to replace the previously existing image data at those locations. Subsequently, after rectangle module 224 detects that pixel 630 and pixel 634 have been written into on-screen data 312, then rectangle module 224 advantageously creates an updated rectangle 624 to include the newly added image data.

Therefore, in certain embodiments, if a transfer rectangle is defined by the expression $[(x_1, y_1), (x_2, y_2)]$, and if rectangle module 224 detects that a new pixel (X,Y) has been written into on-screen data 312, then rectangle module 224 may perform four tests for potentially updating the transfer rectangle. Rectangle module 224 determines whether "X" is less than "$x_1$", and if so, then updates "$x_1$" to equal "X". Rectangle module 224 also determines whether "X" is greater than "$x_2$", and if so, then updates "$x_2$" to equal "X". Rectangle module 224 further determines whether "Y" is less than "$y_1$", and if so, then updates "$y_1$" to equal "Y". Finally, rectangle module 224 determines whether "Y" is greater than "$y_2$", and if so, then updates "$y_2$" to equal "Y". The creation and utilization of transfer rectangles are further discussed below in conjunction with FIGS. 7–10.

Figure 7:
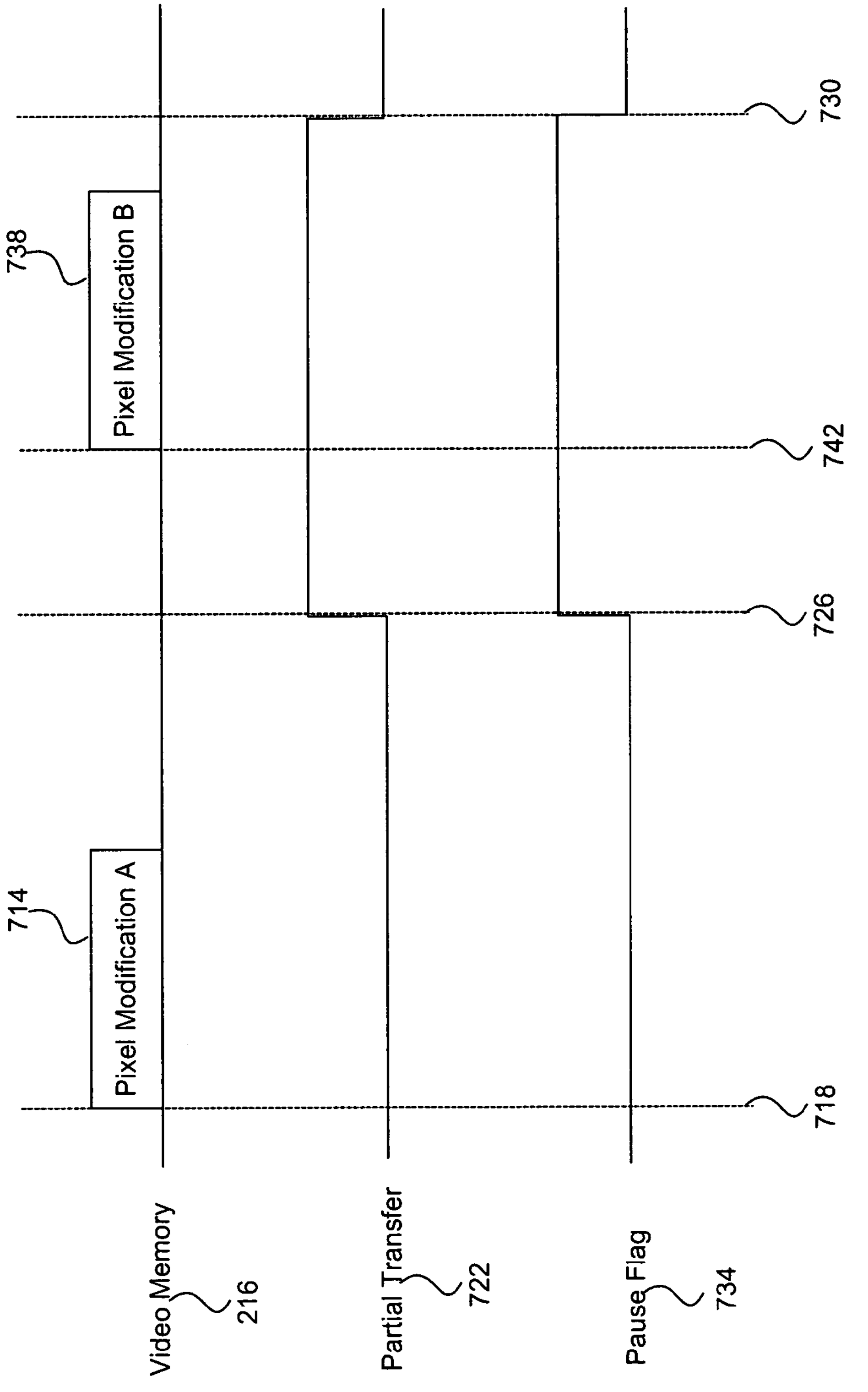
FIG. 7 is a timing diagram for continuously tracing transfer rectangles in accordance with one embodiment of the present invention.

Referring now to FIG. 7, a timing diagram for continuously tracing transfer rectangles shown, in accordance with one embodiment of the present invention. The FIG. 7 embodiment is provided for purposes of illustration, and in alternate embodiments, the present invention may continuously trace transfer rectangles using procedures that include elements and functionalities in addition to, or instead of, certain of the elements and functionalities discussed in conjunction with the FIG. 7 embodiment.

In the FIG. 7 embodiment, at time 718, CPU 122 or other appropriate entity performs a pixel modification A (714) by writing image data into on-screen data 312 in video memory 216 of display controller 128. Then, at time 726, a partial transfer 722 of image data to display 134 is initiated by controller logic 212 of display controller 128 in response to any appropriate stimulus or event. For example, a transfer clock may trigger controller logic 212 to begin a transfer operation after a pre-determined transfer interval has been exceeded, or controller logic 212 may detect that a total written pixel value from a write operation counter has exceeded a pre-determined write-operation pixel threshold.

In the FIG. 7 example, the foregoing transfer operation is initiated at time 726 and ends at time 730. The transfer service duration for servicing the transfer operation is therefore defined as being between time 726 and time 730. However, at time 742, within the time period of the foregoing transfer service duration, CPU 122 or another appropriate entity performs a pixel modification B (738) by writing image data into on-screen data 312 in video memory 216 of display controller 128.

In the FIG. 7 embodiment, because the foregoing write operation for pixel modification B (738) occurs while controller logic 212 of display controller 128 is already servicing a preceding transfer operation, controller logic 212 or other appropriate entity advantageously sets a pause flag 734 at time 726 to thereby cause coordinates module 228 to begin retracing a new secondary transfer rectangle that includes pixel modification B (738). At time 730, when the preceding transfer operation is completed, the foregoing pause flag 734 may then be reset to make secondary rectangle coordinates for the secondary transfer rectangle available as primary rectangle coordinates for a subsequent transfer operation, in accordance with the present invention. Certain embodiments for continuously tracing transfer rectangles are further discussed below in conjunction with FIGS. 8–10.

Figure 8:
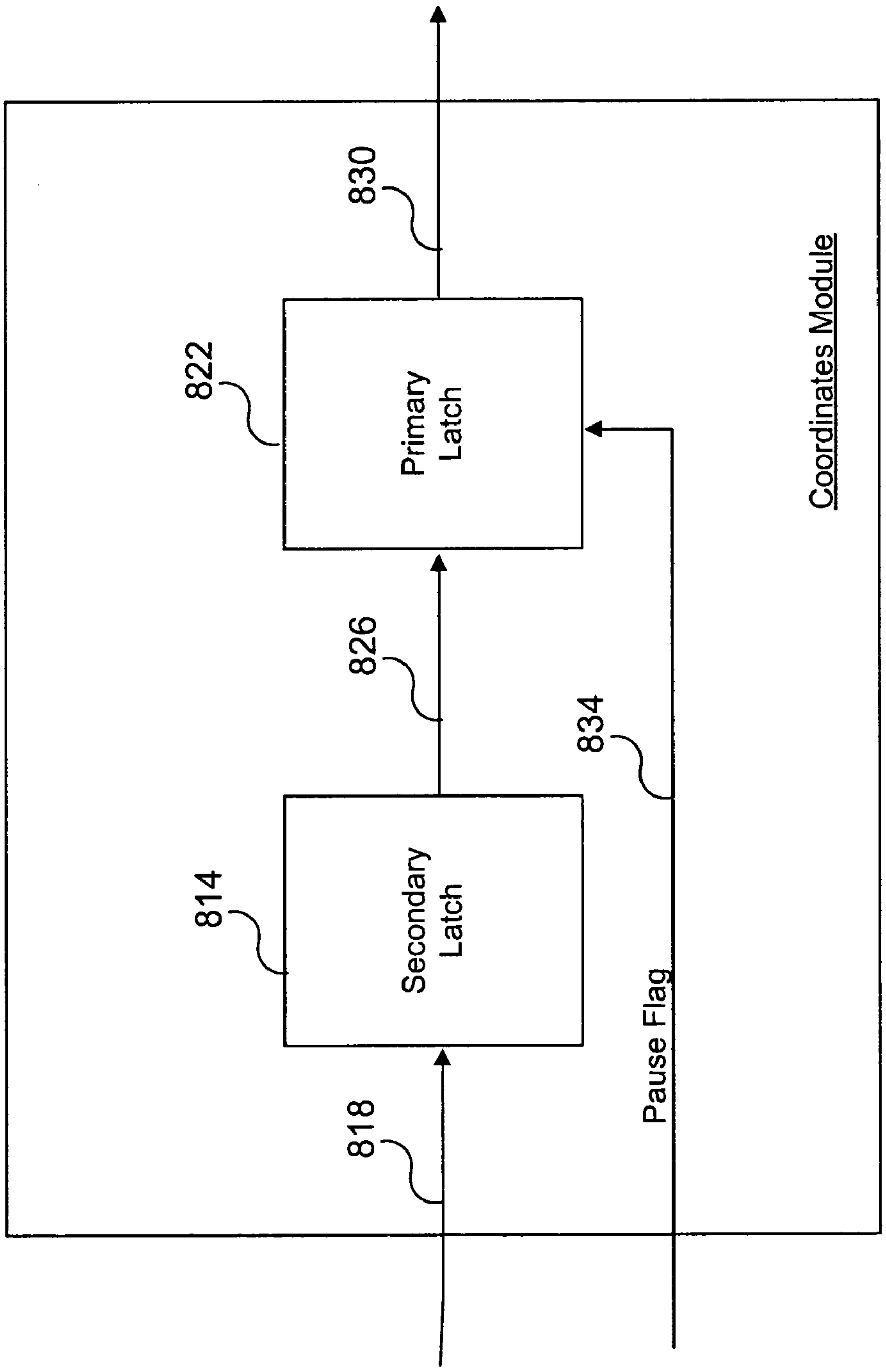
FIG. 8 is a block diagram for one embodiment of the coordinates module of FIG. 2, in accordance with the present invention.

Referring now to FIG. 8, a block diagram for one embodiment of the FIG. 2 coordinates module 228 is shown, in accordance with the present invention. In the FIG. 8 embodiment, coordinates module 228 includes, but is not limited to, a secondary latch 814 and a primary latch 822. In alternate embodiments, coordinates module 228 may include elements and functionalities in addition to, or instead of, certain of the elements and functionalities discussed in conjunction with the FIG. 8 embodiment.

In the FIG. 8 embodiment, in a normal mode, rectangle module 224 continually provides rectangle coordinates for updated transfer rectangles to secondary latch 814 of coordinates module 228 via path 818. Secondary latch 814 then latches the received rectangle coordinates as secondary rectangle coordinates, and also immediately passes the secondary rectangle coordinates to primary latch 822 via path 826. Primary latch 822 latches the received secondary rectangle coordinates as primary rectangle coordinates. Primary latch 822 may then provide the new primary rectangle coordinates via path 830 to controller logic 212 whenever a subsequent partial transfer of a transfer rectangle is initiated.

In the FIG. 8 embodiment, to change from the foregoing normal mode to a pause mode, controller logic 212 or other appropriate entity sets a pause flag 734 (FIG. 7) that is provided to primary latch 822 of coordinates module 228 via path 834. As discussed above in conjunction with FIG. 7, the pause flag 734 is set whenever a transfer operation is being performed for sending a current transfer rectangle of image data to display 134. In practice, setting pause flag 734 causes primary latch 822 to retain the currently latched primary rectangle coordinates for performing the corresponding current transfer operation.

However, in pause mode, secondary latch 814 is not affected by pause flag 834, and therefore continues to update secondary rectangle coordinates for any new transfer rectangles that are detected by rectangle module 224 during the current transfer operation. In the FIG. 8 embodiment, when pause flag 734 is reset after a current transfer operation has been completed, then coordinates module 228 may re-enter the normal mode. Primary latch 822 then advantageously receives and latches the secondary rectangle coordinates for any new transfer rectangles that were traced during the preceding transfer operation as primary rectangle coordinates.

Primary latch 822 makes those new primary rectangle coordinates available to controller logic 212 via path 830 for effectively performing a subsequent transfer operation without the loss of any intervening image data that was written to video memory 216 during the preceding transfer operation. Certain embodiments for effectively utilizing coordinates module 228 to continuously trace transfer rectangles are discussed below in conjunction with FIGS. 8–9.

Figure 9:
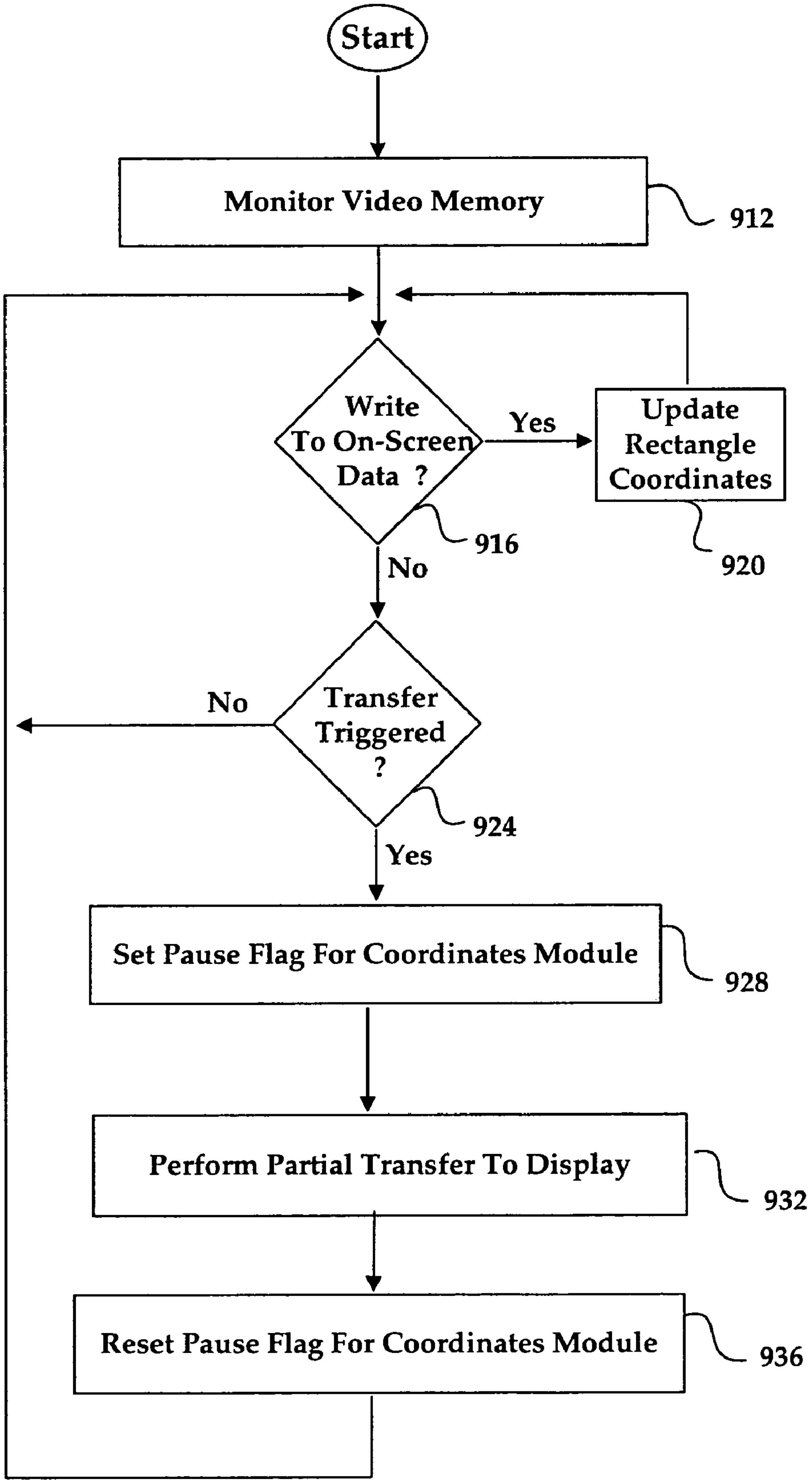
FIG. 9 is a flowchart of method steps for utilizing a coordinates module to update primary rectangle coordinates, in accordance with one embodiment of the present invention.

Referring now to FIG. 9, a flowchart of method steps for updating primary rectangle coordinates is shown, in accordance with one embodiment of the present invention. The FIG. 9 method steps correspond to the operation of a primary latch 822 of coordinates module 228 (FIG. 8). The FIG. 9 flowchart is presented for purposes of illustration, and in alternate embodiments, the present invention may utilize steps and sequences in addition to, or instead of, certain of the steps and sequences discussed in conjunction with the FIG. 9 embodiment.

In the FIG. 9 embodiment, in step 912, a rectangle module 224 from a display controller 128 (FIG. 2) monitors on-screen data 312 of a video memory 216. In step 916, rectangle module 224 determines whether any new write operations to on-screen data 312 of video memory 216 have occurred. In step 920, if any new write operations to on-screen data 312 have occurred, then rectangle module 224 provides any updated transfer rectangle coordinates to coordinates module 228 which responsively updates corresponding primary rectangle coordinates in a primary latch 822 of coordinates module 228 to reflect the foregoing coordinate changes.

In step 916, if no new write operations to on-screen data 312 have occurred, then in step 924, controller logic 212 of display controller 128 determines whether a new current transfer operation has been triggered for sending pixel data of a primary transfer rectangle from video memory 216 to a display 134 for viewing by a device user. If controller logic 212 determines that a new current transfer operation has been triggered, then in step 928, controller logic 212 or another appropriate entity sets a pause flag 734 to place coordinates module 228 into a pause mode that latches primary rectangle coordinates for the primary transfer rectangle into the foregoing primary latch 822 without the possibility of being overwritten until pause flag 734 is reset.

In accordance with the present invention, a secondary latch 814 of coordinates module 228 may advantageously continue to update secondary rectangle coordinates corresponding to a new secondary transfer rectangle representing write operations to video memory 216 that occur while the current transfer operation is being serviced. In step 932, display controller 128 performs the current transfer operation with the primary rectangle coordinates latched in primary latch 822 of coordinates module 228. In step 936, as soon the current transfer operation is completed, controller logic 212 or other appropriate entity resets pause flag 734 to prepare coordinates module 228 for performing a subsequent transfer operation with updated primary rectangle coordinates. In response, primary latch 822 copies and stores the secondary rectangle coordinates from secondary latch 814 as primary rectangle coordinates. One embodiment for the operation of secondary latch 814 of coordinates module 228 is further discussed below in conjunction with FIG. 10.

Figure 10:
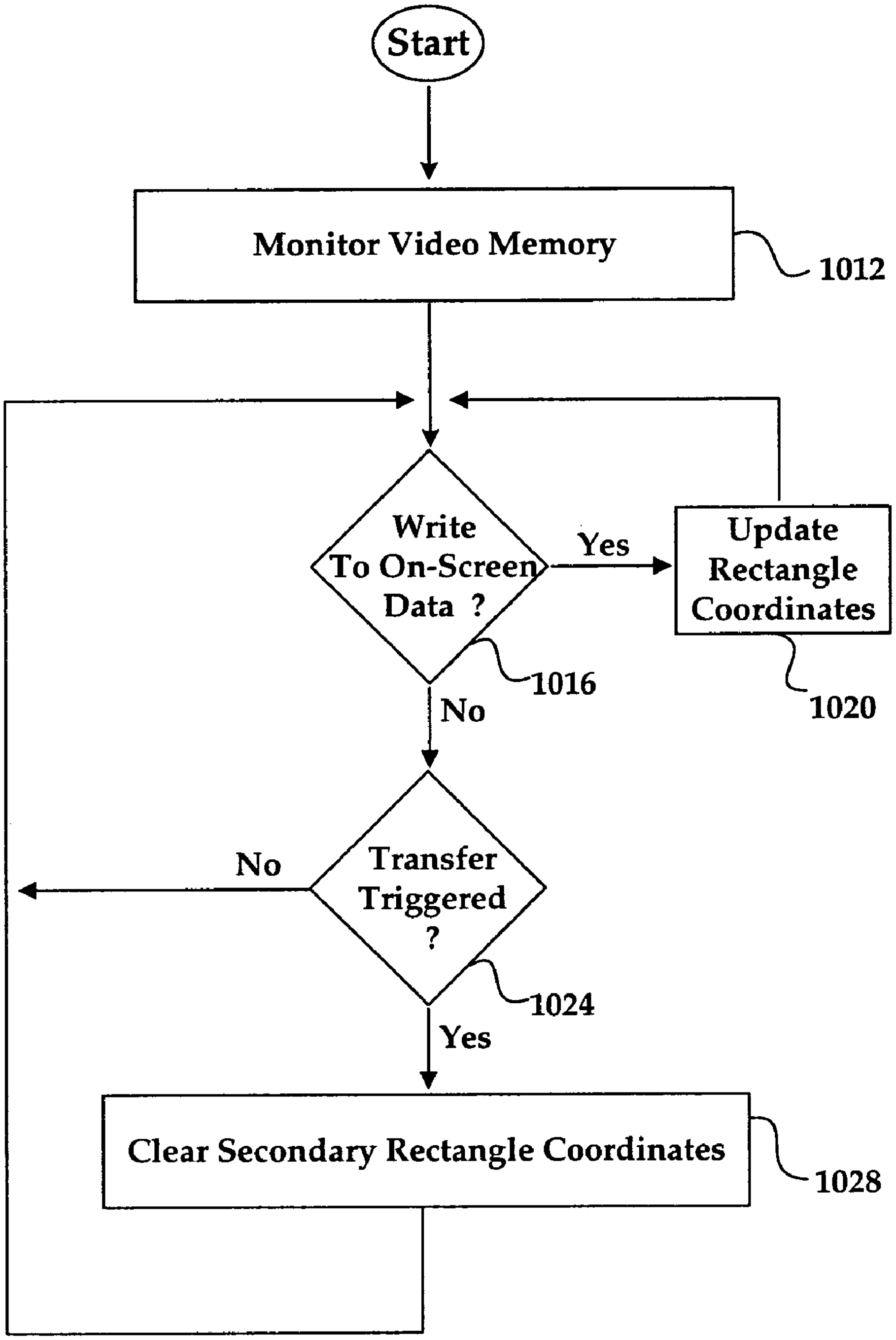
FIG. 10 is a flowchart of method steps for utilizing a coordinates module to update secondary rectangle coordinates, in accordance with one embodiment of the present invention.

Referring now to FIG. 10, a flowchart of method steps for updating secondary rectangle coordinates is shown, in accordance with one embodiment of the present invention. The FIG. 10 method steps correspond to the operation of a secondary latch 814 of coordinates module 228 (FIG. 8). The FIG. 10 flowchart is presented for purposes of illustration, and in alternate embodiments, the present invention may utilize steps and sequences in addition to, or instead of, certain of the steps and sequences discussed in conjunction with the FIG. 10 embodiment.

In the FIG. 10 embodiment, in step 1012, a rectangle module 224 from a display controller 128 (FIG. 2) monitors on-screen data 312 of a video memory 216. In step 1016, rectangle module 224 determines whether any new write operations to on-screen data 312 of video memory 216 have occurred. In step 1020, if any new write operations to on-screen data 312 have occurred, then rectangle module 224 provides any updated transfer rectangle coordinates to coordinates module 228 which responsively updates corresponding secondary rectangle coordinates in a secondary latch 814 of coordinates module 228 to reflect the foregoing coordinate changes.

In step 1016, if no new write operations to on-screen data 312 have occurred, then in step 1024, controller logic 212 of display controller 128 determines whether a new current transfer operation has been triggered for sending pixel data of a current primary transfer rectangle from video memory 216 to a display 134 for viewing by a device user. If controller logic 212 determines that a new current transfer operation has been triggered, then in step 1028, secondary latch 814 of coordinates module 228 clears the current secondary rectangle coordinates.

In accordance with the present invention, secondary latch 814 of coordinates module 228 may then advantageously continue to update new secondary rectangle coordinates corresponding to any new secondary transfer rectangles representing write operations to video memory 216 that occur while the current transfer operation is being serviced. In the FIG. 10 embodiment, after the current transfer operation has been serviced, secondary latch 814 may then provide any latched secondary rectangle coordinates to a primary latch 822 of coordinates module 228. Primary latch 822 may then latch the received secondary rectangle coordinates as primary rectangle coordinates for later utilization in a subsequent transfer operation. The present invention therefore provides an improved system and method for continuously tracing transfer rectangles for performing image data transfers.

The invention has been explained above with reference to certain preferred embodiments. Other embodiments will be apparent to those skilled in the art in light of this disclosure. For example, the present invention may be implemented using certain configurations and techniques other than those described in the embodiments above. Additionally, the present invention may effectively be used in conjunction with systems other than those described above as the preferred embodiments. Therefore, these and other variations upon the foregoing embodiments are intended to be covered by the present invention, which is limited only by the appended claims.

What is claimed is:

1. A system for handling electronic information, comprising:

a rectangle module that detects write operations to on-screen data in a video memory, said rectangle module updating a primary transfer rectangle during a normal mode to include pixel data from said write operations;

a coordinates module that stores primary rectangle coordinates defining said primary transfer rectangle for performing a current transfer operation; and controller logic that instructs said coordinates module to enter a pause mode before initiating said current transfer operation, said coordinates module retaining said primary rectangle coordinates during said pause mode, said coordinates module also storing secondary rectangle coordinates for a secondary transfer rectangle formed during said pause mode by continuing to detect said write operations, said controller logic instructing said coordinates module to resume said normal mode after said current transfer operation concludes, said coordinates module then responsively replacing said primary rectangle coordinates with said secondary rectangle coordinates for performing a subsequent transfer operation.

2. The system of claim 1 wherein said controller logic, said rectangle module, and said coordinates module are a part of a display controller that is implemented as an integrated circuit device that functions as a transparent interface between a central processing unit and a display of a host electronic device.

3. The system of claim 1 wherein said controller logic, said rectangle module, and said coordinates module are implemented in a display controller that coordinates image-data transfer operations for providing image data to a random-access-memory based liquid-crystal display of a portable electronic device.

4. The system of claim 3 wherein said portable electronic device is implemented as a cellular telephone that utilizes said display controller to conserve system resources and operating power by performing a partial transfer with said primary transfer rectangle during said image-data transfer operations.

5. The system of claim 1 wherein said controller logic instructs said coordinates module to enter said pause mode by setting a pause flag, said controller logic subsequently instructing said coordinates module to resume said normal mode after said current transfer operation concludes by resetting said pause flag.

6. The system of claim 1 wherein said coordinates module stores said secondary rectangle coordinates for said secondary transfer rectangle during said pause mode to prevent losing any of said pixel data that is written to said on-screen data of said video memory during said current transfer operation.

7. The system of claim 1 wherein said rectangle module updates a current primary transfer rectangle during said normal mode to produce an updated primary transfer rectangle whenever said pixel data from said write operations is located outside of said current primary transfer rectangle, said rectangle module also updating a current secondary transfer rectangle during both said normal mode and said pause mode to produce an updated secondary transfer rectangle whenever said pixel data from said write operations is located outside of said current secondary transfer rectangle.

8. The system of claim 1 wherein said primary transfer rectangle is defined by a rectangle notation:

$$[(x_1,y_1),(x_2,y_2)]$$

where said $(x_1, y_1)$ are pixel coordinates of a top left pixel from said primary transfer rectangle, and where said $(x_2, y_2)$ are bottom right coordinates of said primary transfer rectangle.

9. The system of claim 8 wherein said rectangle module detects that a new pixel (X, Y) has been written into said on-screen data, said rectangle module responsively performing four tests for updating said primary transfer rectangle, said rectangle module determining whether said X is less than said $x_1$, and if so, then updating said $x_1$ to equal said X, said rectangle module also determining whether said X is greater than said $x_2$, and if so, then updating said $x_2$ to equal said X, said rectangle module further determining whether said Y is less than said $y_1$, and if so, then updating said $y_1$ to equal said Y, said rectangle module finally determining whether said Y is greater than said $y_2$, and if so, then updating said $y_2$ to equal said Y.

10. The system of claim 1 wherein said coordinates module includes a primary latch for storing said primary rectangle coordinates, said coordinates module also including a secondary latch for storing said secondary rectangle coordinates.

11. The system of claim 10 wherein said rectangle module continually provides updated rectangle coordinates for updated transfer rectangles to said secondary latch which stores said updated rectangle coordinates as said secondary rectangle coordinates, said secondary latch also passing said secondary rectangle coordinates during said normal mode to said primary latch which stores said secondary rectangle coordinates as said primary rectangle coordinates, said primary latch retaining said primary rectangle coordinates during said pause mode, said secondary latch continuing to update said secondary rectangle coordinates during said pause mode, said primary latch again receiving and storing said secondary rectangle coordinates as primary rectangle coordinates only after said current transfer operation is completed and said normal mode is resumed.

12. The system of claim 1 wherein performing a partial transfer of only said current transfer rectangle conserves system resources and operating power for a host electronic device because said partial transfer operates on a reduced amount of image data when compared to transferring entire frames of said on-screen data from said video memory.

13. The system of claim 1 wherein a primary latch of said coordinates module updates and stores said primary rectangle coordinates when notified by said rectangle module regarding at least one of said write operations to said on-screen data.

14. The system of claim 13 wherein said controller logic initiates said current transfer operation in response to a transfer trigger event that alternately includes a transfer clock trigger that occurs after a pre-determined transfer interval has been exceeded, and a write-operation counter trigger that indicates that a total written pixel value has exceeded a pre-determined write-operation pixel threshold.

15. The system of claim 14 wherein said controller logic sets a pause flag to instruct said coordinates module to enter said pause mode in response to said transfer trigger event, said controller logic then coordinating said current transfer operation.

16. The system of claim 15 wherein said controller logic resets said pause flag when said current transfer operation is completed to resume said normal mode, said primary latch then receiving and storing said secondary rectangle coordinates as said primary rectangle coordinates for performing said subsequent transfer operation.

17. The system of claim 1 wherein a secondary latch in said coordinates module updates and stores said secondary rectangle coordinates when notified by said rectangle module regarding at least one of said write operations to said on-screen data.

18. The system of claim 17 wherein said controller logic sets a pause flag and initiates said current transfer operation in response to a transfer trigger event that alternately includes a transfer clock trigger after a pre-determined transfer interval has been exceeded, and write-operation counter trigger that indicates that a total written pixel value has exceeded a pre-determined write-operation pixel threshold.

19. The system of claim 18 wherein said controller logic resets said pause flag when said current transfer operation is completed to resume said normal mode.

20. The system of claim 19 wherein said secondary latch deletes a current version of said secondary rectangle coordinates when said pause flag is reset, and said primary latch then storing said secondary rectangle coordinates as said primary rectangle coordinates for performing said subsequent transfer operation.

21. A method for handling electronic information, comprising the steps of:

detecting write operations to on-screen data in a video memory by utilizing a rectangle module that updates a primary transfer rectangle during a normal mode to include pixel data from said write operations;

storing primary rectangle coordinates with a coordinates module, said primary rectangle coordinates defining said primary transfer rectangle for performing a current transfer operation;

instructing said coordinates module to enter a pause mode before initiating said current transfer operation by utilizing controller logic, said coordinates module retaining said primary rectangle coordinates during said pause mode, said coordinates module also storing secondary rectangle coordinates for a secondary transfer rectangle formed during said pause mode by continuing to detect said write operations; and resuming said normal mode after said current transfer operation concludes, said coordinates module then responsively replacing said primary rectangle coordinates with said secondary rectangle coordinates for performing a subsequent transfer operation.

22. The method of claim 21 wherein said controller logic, said rectangle module, and said coordinates module are a part of a display controller that is implemented as an integrated circuit device that functions as a transparent interface between a central processing unit and a display of a host electronic device.

23. The method of claim 21 wherein said controller logic, said rectangle module, and said coordinates module are implemented in a display controller that coordinates image-data transfer operations for providing image data to a random-access-memory based liquid-crystal display of a portable electronic device.

24. The method of claim 23 wherein said portable electronic device is implemented as a cellular telephone that utilizes said display controller to conserve system resources and operating power by performing a partial transfer with said primary transfer rectangle during said image-data transfer operations.

25. The method of claim 21 wherein said controller logic instructs said coordinates module to enter said pause mode by setting a pause flag, said controller logic subsequently instructing said coordinates module to resume said normal mode after said current transfer operation concludes by resetting said pause flag.

26. The method of claim 21 wherein said coordinates module stores said secondary rectangle coordinates for said secondary transfer rectangle during said pause mode to prevent losing any of said pixel data that is written to said on-screen data of said video memory during said current transfer operation.

27. The method of claim 21 wherein said rectangle module updates a current primary transfer rectangle during said normal mode to produce an updated primary transfer rectangle whenever said pixel data from said write operations is located outside of said current primary transfer rectangle, said rectangle module also updating a current secondary transfer rectangle during both said normal mode and said pause mode to produce an updated secondary transfer rectangle whenever said pixel data from said write operations is located outside of said current secondary transfer rectangle.

28. The method of claim 21 wherein said primary transfer rectangle is defined by a rectangle notation:

$$[(x_1,y_1),(x_2,y_2)]$$

where said $(x_1, y_1)$ are pixel coordinates of a top left pixel from said primary transfer rectangle, and where said $(x_2, y_2)$ are bottom right coordinates of said primary transfer rectangle.

29. The method of claim 28 wherein said rectangle module detects that a new pixel (X, Y) has been written into said on-screen data, said rectangle module responsively performing four tests for updating said primary transfer rectangle, said rectangle module determining whether said X is less than said $x_1$, and if so, then updating said $x_1$ to equal said X, said rectangle module also determining whether said X is greater than said $x_2$, and if so, then updating said $x_2$ to equal said X, said rectangle module further determining whether said Y is less than said $y_1$, and if so, then updating said $y_1$ to equal said Y, said rectangle module finally determining whether said Y is greater than said $y_2$, and if so, then updating said $y_2$ to equal said Y.

30. The method of claim 21 wherein said coordinates module includes a primary latch for storing said primary rectangle coordinates, said coordinates module also including a secondary latch for storing said secondary rectangle coordinates.

31. The method of claim 30 wherein said rectangle module continually provides updated rectangle coordinates for updated transfer rectangles to said secondary latch which stores said updated rectangle coordinates as said secondary rectangle coordinates, said secondary latch also passing said secondary rectangle coordinates during said normal mode to said primary latch which stores said secondary rectangle coordinates as said primary rectangle coordinates, said primary latch retaining said primary rectangle coordinates during said pause mode, said secondary latch continuing to update said secondary rectangle coordinates during said pause mode, said primary latch again receiving and storing said secondary rectangle coordinates as primary rectangle coordinates only after said current transfer operation is completed and said normal mode is resumed.

32. The method of claim 21 wherein performing a partial transfer of only said current transfer rectangle conserves system resources and operating power for a host electronic device because said partial transfer operates on a reduced amount of image data when compared to transferring entire frames of said on-screen data from said video memory.

33. The method of claim 21 wherein a primary latch of said coordinates module updates and stores said primary rectangle coordinates when notified by said rectangle module regarding at least one of said write operations to said on-screen data.

34. The method of claim 33 wherein said controller logic initiates said current transfer operation in response to a transfer trigger event that alternately includes a transfer clock trigger that occurs after a pre-determined transfer interval has been exceeded, and write-operation counter trigger that indicates that a total written pixel value has exceeded a pre-determined write-operation pixel threshold.

35. The method of claim 34 wherein said controller logic sets a pause flag to instruct said coordinates module to enter said pause mode in response to said transfer trigger event, said controller logic then coordinating said current transfer operation.

36. The method of claim 35 wherein said controller logic resets said pause flag when said current transfer operation is completed to resume said normal mode, said primary latch then receiving and storing said secondary rectangle coordinates as said primary rectangle coordinates for performing said subsequent transfer operation.

37. The method of claim 21 wherein a secondary latch in said coordinates module updates and stores said secondary rectangle coordinates when notified by said rectangle module regarding at least one of said write operations to said on-screen data.

38. The method of claim 37 wherein said controller logic sets a pause flag and initiates said current transfer operation in response to a transfer trigger event that alternately includes a transfer clock trigger after a pre-determined transfer interval has been exceeded, and write-operation counter trigger that indicates that a total written pixel value has exceeded a pre-determined write-operation pixel threshold.

39. The method of claim 38 wherein said controller logic resets said pause flag when said current transfer operation is completed to resume said normal mode.

40. The method of claim 39 wherein said secondary latch deletes a current version of said secondary rectangle coordinates when said pause flag is reset, and said primary latch then storing said secondary rectangle coordinates as said primary rectangle coordinates for performing said subsequent transfer operation.

41. A system for handling electronic information, comprising:

means for detecting write operations to on-screen data in a video memory, said means for detecting then updating a primary transfer rectangle during a normal mode to include pixel data from said write operations;

means for storing primary rectangle coordinates that define said primary transfer rectangle for performing a current transfer operation;

means for entering a pause mode before initiating said current transfer operation:

means for retaining said primary rectangle coordinates during said pause mode, said means for retaining also storing secondary rectangle coordinates for a secondary transfer rectangle formed during said pause mode by continuing to detect said write operations; and means for resuming said normal mode after said current transfer operation concludes, said means for retaining then responsively replacing said primary rectangle coordinates with said secondary rectangle coordinates for performing a subsequent transfer operation.

42. A system for handling electronic information, comprising:

a rectangle module that updates a primary transfer rectangle to include pixel data from write operations to a video memory; and a coordinates module that stores primary rectangle coordinates defining said primary transfer rectangle for performing a current transfer operation, said coordinates module also storing secondary rectangle coordinates for a secondary transfer rectangle formed by continuing to detect said write operations during said current transfer operation, said coordinates module replacing said primary rectangle coordinates with said secondary rectangle coordinates for performing a subsequent transfer operation.

* * * * *